United States Patent
Hsieh (10) Patent No.: US 12,368,704 B2
(45) Date of Patent: Jul. 22, 2025

(54) CERTIFICATE-BASED CONNECTIONS REFLECTING A NETWORK ARCHITECTURE

(71) Applicant: Ruckus IP Holdings LLC, Claremont, NC (US)

(72) Inventor: Huang-Ju Hsieh, Taichung (TW)

(73) Assignee: Ruckus IP Hollings LLC, Claremont, NC (US)

( * ) Notice: Subject to any disclaimer, the term of this patent is extended or adjusted under 35 U.S.C. 154(b) by 180 days.

(21) Appl. No.: 18/133,555

(22) Filed: Apr. 12, 2023

(65) Prior Publication Data

US 2023/0336540 A1    Oct. 19, 2023

Related U.S. Application Data

(60) Provisional application No. 63/330,329, filed on Apr. 13, 2022.

(51) Int. Cl.
*H04L 9/40* (2022.01)
*H04L 41/044* (2022.01)
*H04L 41/28* (2022.01)

(52) U.S. Cl.
CPC ........ *H04L 63/0823* (2013.01); *H04L 41/044* (2013.01); *H04L 41/28* (2013.01)

(58) Field of Classification Search
CPC ... H04L 63/0823; H04L 41/044; H04L 41/28; H04L 41/0806
See application file for complete search history.

(56) References Cited

U.S. PATENT DOCUMENTS

| | | | | |
|---|---|---|---|---|
| 7,600,113 | B2 * | 10/2009 | Kuehnel | H04L 63/0823 713/168 |
| 10,700,791 | B2 * | 6/2020 | Al-Mousa | H04B 11/00 |
| 10,841,102 | B2 * | 11/2020 | Nitschke | H04L 9/3297 |
| 11,265,714 | B2 * | 3/2022 | Wan | H04W 12/069 |
| 2002/0103909 | A1 * | 8/2002 | Devine | H04L 69/163 709/227 |
| 2004/0250062 | A1 * | 12/2004 | Douglas | H04L 63/0823 726/5 |
| 2004/0268152 | A1 * | 12/2004 | Xia | H04L 63/126 726/5 |
| 2006/0047951 | A1 * | 3/2006 | Reilly | H04L 9/3263 713/158 |
| 2008/0162928 | A1 * | 7/2008 | Qiu | H04L 9/3268 713/156 |

(Continued)

*Primary Examiner* — Richard G Keehn
(74) *Attorney, Agent, or Firm* — Steven Stupp (57) ABSTRACT

A computer network device that implements a data plane is described. During operation, the computer network device may receive, associated with a second computer network device, a request to establish a connection, where the request includes an instance of a first type of certificate associated with a first certificate authority for a first layer in a hierarchy in the network, and/or an instance of a second type of certificate associated with a second certificate authority for a second layer in the hierarchy, where the first layer is lower in the hierarchy than the second layer. Then, the computer network device may selectively establish a connection in the network with the second computer network device based at least in part on the instance of the first type of certificate and/or the instance of the second type of certificate.

20 Claims, 7 Drawing Sheets

(56) References Cited

U.S. PATENT DOCUMENTS

| | | | | |
|---|---|---|---|---|
| 2008/0307221 | A1* | 12/2008 | Horita | H04L 9/3297 |
| | | | | 713/156 |
| 2009/0125721 | A1* | 5/2009 | Numaoka | G06F 21/10 |
| | | | | 713/175 |
| 2016/0337127 | A1* | 11/2016 | Schultz | H04L 63/0823 |
| 2022/0393891 | A1* | 12/2022 | Mackcay | H04L 9/3236 |
| 2023/0127516 | A1* | 4/2023 | Tartan | H04L 63/0823 |
| | | | | 713/158 |

* cited by examiner

CERTIFICATE-BASED CONNECTIONS REFLECTING A NETWORK ARCHITECTURE

CROSS REFERENCE TO RELATED APPLICATIONS

This application claims priority under 35 U.S.C. 119(e) to U.S. Provisional Application Ser. No. 63/330,329, "Certificate-Based Connections Reflecting a Network Architecture," filed on Apr. 13, 2022, by Huang-Ju Hsieh, the contents of which are herein incorporated by reference.

FIELD

The described embodiments relate to techniques for dynamically managing one or more connections between data planes and access points (and, more generally, computer network devices) based at least in part on certificates and a network architecture.

BACKGROUND

Many electronic devices are capable of wirelessly communicating with other electronic devices. Notably, these electronic devices can include a networking subsystem that implements a network interface for: a cellular network (UMTS, LTE, 5G Core or 5GC, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that may communicate wirelessly with each other and with other electronic devices using Wi-Fi, and that provide access to another network (such as the Internet) via IEEE 802.3 (which is sometimes referred to as 'Ethernet').

Many networks include logical divisions among different users. For example, in a network provided by a managed service provider (MSP) there may be multiple customers tenants. While computer network devices in the network that are associated with a given tenant communicate with each other and with computer network devices associated with the MSP, typically the computer network devices associated different tenants are not allowed to communicate directly with each other.

Implementing and managing the hierarchical relationships and allowed connections in a network is often challenging. For example, in some existing approaches, a controller of the computer network devices in a network may provide a given computer network devices (such as a data plane) a file or a list of allowed connections to other computer network devices. Then, based on this list, the given computer network devices may maintain connections with other computer network devices in the network. Notably, the given computer network devices may use the list as a look-up table to establish and maintain connections with other computer network devices that are included in the list.

However, it can be complicated for the controller to maintain and disseminate the lists to computer network devices. Notably, because the tenants and computer network devices vary with time, the controller may need to dynamically update and distribute lists to the computer network devices. This management effort may be complicated and time-consuming, especially in large network deployments with multiple computer network devices and tenants.

SUMMARY

A computer network device (including one or more electronic devices) that implements a data plane is described. This computer network device includes: an interface circuit that communicates with a second computer network device in a network (such as an access point or another computer network device that implement another data plane); a processor; and memory storing program instructions. During operation, the computer network device receives, associated with the second computer network device, a request to establish a connection, where the request includes an instance of a first type of certificate associated with a first certificate authority for a first layer in a hierarchy in the network and/or an instance of a second type of certificate associated with a second certificate authority for a second layer in the hierarchy, where the first layer is lower in the hierarchy than the second layer. Then, based at least in part on the instance of the first type of certificate and/or the instance of the second type of certificate, the computer network device selectively establishes the connection in the network with the second computer network device.

Note that the first layer may be associated with a tenant and the second layer may be associated with an MSP of the network, where the tenant is a customer of the MSP. Note when the second computer network device is in the first layer, the second computer network device may be an access point. Alternatively, when the second computer network device is in the second layer, the second computer network device may implement a data plane.

Moreover, based at least in part on the instance of the first type of certificate and/or the instance of the second type of certificate, the computer network device may exclude the connection with the second computer network devices when the second computer network device is associated with a different tenant of the MSP and/or a different MSP.

Furthermore, the second computer network device may be associated with a different manufacturer or provider than a manufacturer or a provider of the computer network device.

Additionally, the instance of the first type of certificate may be associated with a first computer system and the instance of the second type of certificate may be associated with a second computer system, which may be the same as or different from the first computer system. In some embodiments, the first computer system and/or the second computer system may include a controller of the computer network device and the second computer network device.

Furthermore, the instance of the first type of certificate may be signed by the first certificate authority, and the instance of the second type of certificate may be signed by the second certificate authority.

Another embodiment provides the second computer network device that performs at least some of the aforementioned operations in one or more of the preceding embodiments.

Another embodiment provides the first computer system that performs at least some of the aforementioned operations in one or more of the preceding embodiments.

Another embodiment provides the second computer system that performs at least some of the aforementioned operations in one or more of the preceding embodiments.

Another embodiment provides a computer-readable storage medium with program instructions for use with a component in or associated with the network (such as the computer network device, the second computer network device, the first computer system or the second computer system). When executed by the component, the program instructions cause the component to perform at least some of the aforementioned operations in one or more of the preceding embodiments.

Another embodiment provides a method, which may be performed by the component. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer network device (including one or more electronic devices) that implements a data plane is described. During operation, the computer network device may receive, associated with a second computer network device, a request to establish a connection, where the request includes an instance of a first type of certificate associated with a first certificate authority for a first layer in a hierarchy in the network and/or an instance of a second type of certificate associated with a second certificate authority for a second layer in the hierarchy, where the first layer is lower in the hierarchy than the second layer. Then, the computer network device may selectively establish the connection in the network with the second computer network device based at least in part on the instance of the first type of certificate and/or the instance of the second type of certificate.

By using the types of certificates to selectively establish connections in the network, these communication techniques may simplify management of computer network devices in the network. Notably, the communication techniques may eliminate a need to dynamically update and distribute files of lists to the computer network devices that are used to define the one or more connections in the network (such as one or more other computer network devices that are allowed to have the one or more connections to the computer network device, such as the second computer network device). These capabilities may reduce the cost and effort needed to manage the network, and may make the management more flexible, such as when the hierarchy changes (e.g., when there is a new tenant or when there is a change to the computer network device and/or the one or more other computer network devices). Consequently, the communication techniques may improve the user experience when managing and using computer network devices and the network.

In the discussion that follows, electronic devices or components in a system communicate packets in accordance with a wireless communication protocol, such as: a wireless communication protocol that is compatible with an IEEE 802.11 standard (which is sometimes referred to as WiFi®, from the Wi-Fi Alliance of Austin, Texas), Bluetooth or Bluetooth low energy (BLE), an IEEE 802.15.4 standard (which is sometimes referred to as Zigbee), a cellular-telephone network or data network communication protocol (such as a third generation or 3G communication protocol, a fourth generation or 4G communication protocol, e.g., Long Term Evolution or LTE (from the $3^{rd}$ Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer or computer system (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

Figure 1:
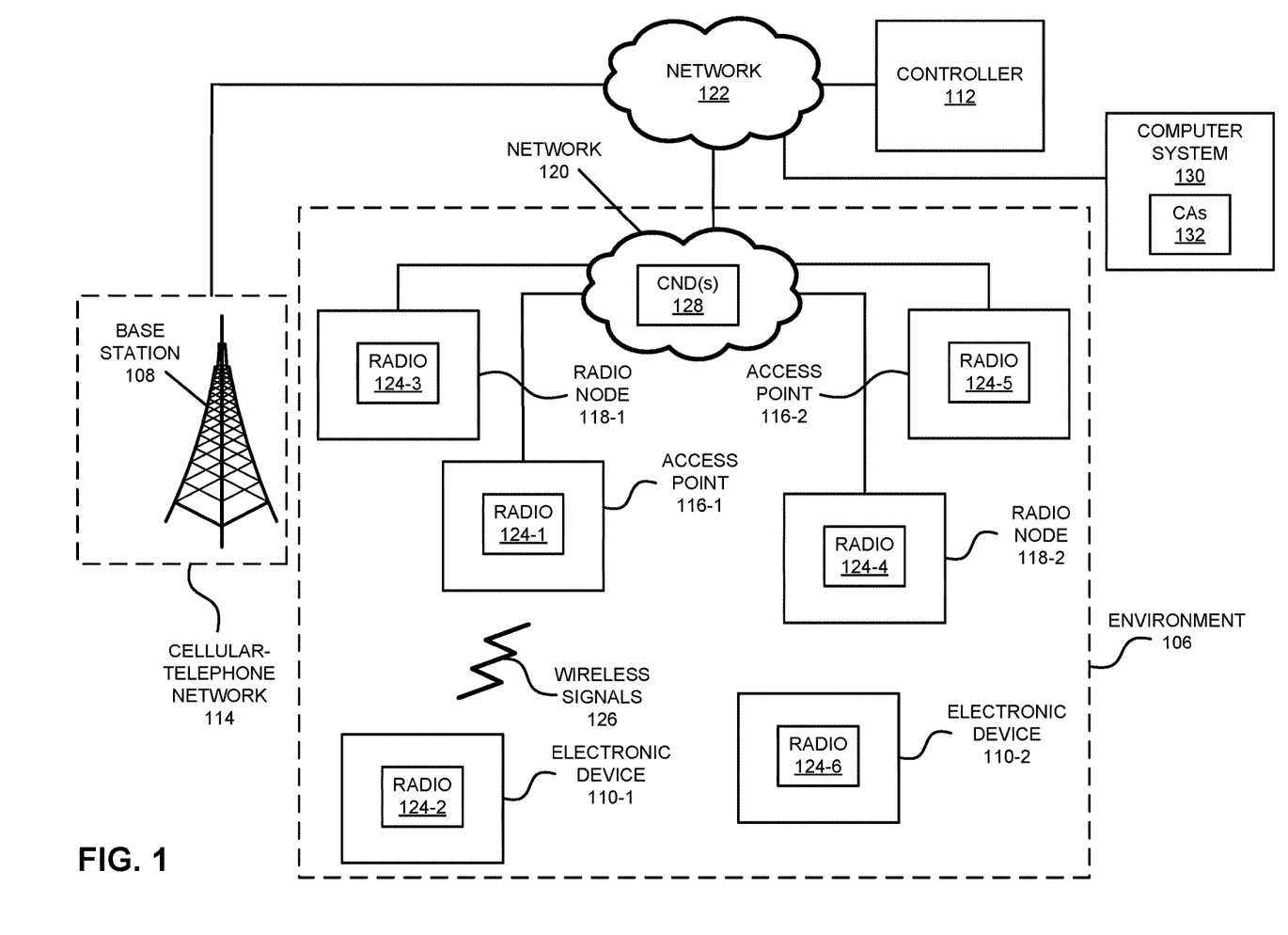
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, a controller (which may be a local or a cloud-based controller that manages and/or configures the one or more access points 116, the one or more radio nodes 118 and/or one or more computer network devices or CNDs 128, or that provides cloud-based storage and/or analytical services) and/or computer system 130 (which may include one or more computers) using a wired communication protocol (such as Ethernet) via network 120 and/or 122. (In FIG. 1, note that a given one of the one or more access points 116, the one or more radio nodes 118 and the one or more computer network devices 128, such as access point 116-1, may be an instance of a 'computer network device'.) This controller may be implemented by a computer system 112, which may include one or more computers. However, in some embodiments, access points 116 and/or radio nodes 118 may communicate with each other and/or the controller using wireless communication (e.g., one of access points 116 may be a mesh access point in a mesh network). Note that networks 120 and 122 may be the same or different networks. For example, networks 120 and/or 122 may an LAN, an intra-net or the Internet. In some embodiments, network 120 may include one or more routers, one or more switches and/or one or more data planes (such as one or more data planes implemented by one of more of computer network device 128). In some embodiments, a 'data plane' may be one or more electronic devices that manages traffic from or associated with the one or more access points 116, the one or more radio nodes 118, one or more computer network devices, one or more sources, and/or one or more destinations, such as by controlling routing of the data to a given destination.

Figure 7:
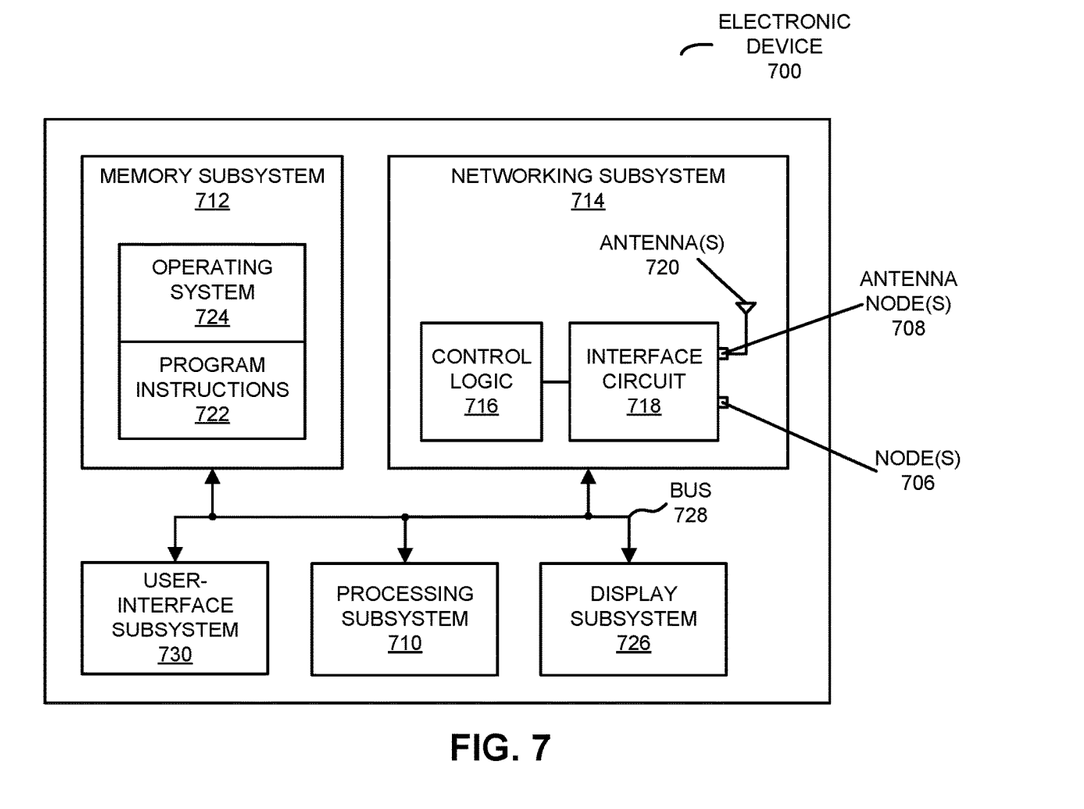
FIG. 7 is a block diagram illustrating an example of an electronic device in accordance with an embodiment of the present disclosure.

As described further below with reference to FIG. 7, electronic devices 110, computer system 112, access points 116, radio nodes 118, computer network device 128 and computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple-input multiple-output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to manage allowed connections in a network. In order to address these problems, as discussed below with reference to FIGS. 2-6, the one or more access points 116, the one or more radio nodes 118, the computer network devices 128 and/or computer system 130 may implement the communication techniques. Notably, the network in FIG. 1 may include one or more MSPs, and a given MSP may support one or more tenants or customers. Connections may be allowed between the one or more access points 116, the one or more radio nodes 118 and/or the computer network devices 128 associated with a given tenant, and/or between the one or more access points 116, the one or more radio nodes 118 and/or the computer network devices 128 associated with the given tenant of a given MSP. However, connections may not be allowed between the one or more access points 116, the one or more radio nodes 118 and/or the computer network devices 128 associated with different tenants, a given tenant and a different MSP, or different MSPs.

Instead of the one or more access points 116, the one or more radio nodes 118 and/or the computer network devices 128 using files or lists of allowed connections (which, e.g., may have been provided by the controller, such as computer system 112), certificate authorities (CAs) 132 in computer system 130 may provide different types of certificates associated with tenants and/or MSPs to the one or more access points 116, the one or more radio nodes 118 and/or the computer network devices 128. Then, the one or more access points 116, the one or more radio nodes 118 and/or the computer network devices 128 may use these types of certificates to selectively establish one or more connections between pairs of computer network devices in the one or more access points 116, the one or more radio nodes 118 and/or the computer network devices 128.

For example, one of the one or more computer network devices 128 may implement a data plane for a tenant of an MSP in the network. Moreover, access point 116-1 may be associated with this tenant. The access point 116-1 may request and may receive an instance of a first type of certificate associated with the tenant from one of the certificate authorities 132 in computer system 130. Moreover, access point 116-1 may request and may receive an instance of a second type of certificate associated with the MSP from another one of the certificate authorities 132 in computer system 130.

Similarly, the one of the one or more computer network devices 128 may optionally request and may optionally receive another instance of the first type of certificate associated with the tenant from one of the certificate authorities 132 in computer system 130. Moreover, the one of the one or more computer network devices 128 may optionally request and may optionally receive another instance of the second type of certificate associated with the MSP from the other one of the certificate authorities 132 in computer system 130.

Then, based at least in part on the instance of the first type of certificate and the instance of the second type of certificate, access point 116-1 and the one of the one or more computer network devices 128 may selectively establish a connection in the network. For example, access point 116-1 may provide a request to establish the connection to the one of the one or more computer network devices 128, where the request may include the instance of the first type of certificate and/or the instance of the second type of certificate. Next, the one of the one or more computer network devices 128 may determine whether to establish and maintain the one or more connection by confirming that the instance of the first type of certificate corresponds to the tenant and/or the instance of the second type of certificate corresponds to the MSP. Alternatively, the determination may be based at least in part on a comparison of the other instance of the first type of certificate and the instance of the first type of certificate and a comparison of the other instance of the second type of certificate and the instance of the second type of certificate.

However, access point 116-2 may be associated with a different tenant and/or a different MSP in the network. Consequently, access point 116-2 may request and may receive one or more instances of one or more different types of certificates from certificate authorities 132 in computer system 130. Therefore, when access point 116-2 communicates a request to establish a second connection in the network to the one of the one or more computer network devices 128 (where the request may include the one or more instances of the one or more different types of certificates), the one of the one or more computer network devices 128 may determine not to establish the second connection with access point 116-2.

In these ways, the communication techniques may allow components in the network (such as the one or more access points 116, the one or more radio nodes 118, and/or the one or more computer network devices 128) to selectively and flexibly establish and maintain one or more connections. These capabilities may reduce the complexity and the effort needed to provide the necessary information for selectively establishing the one or more connections. Consequently, the communication techniques may simplify the management of the one or more access points 116, the one or more radio nodes 118, the one or more computer network devices 128 and/or the network. Therefore, the communication techniques may improve the user experience when using the one or more access points 116, the one or more radio nodes 118, the one or more computer network devices 128 and/or the network.

While FIG. 1 illustrates a distributed decision making (e.g., by a given one of the one or more access points 116, the one or more radio nodes 118 and/or the one or more computer network devices 128) regarding the allowed one or more connections in the network based at least in part on different types of certificates, in some embodiments one or more of the operations in the set of operations may be performed in a centralized manner. Moreover, while FIG. 1 illustrates computer system 130 distributing the different types of certificates to the one or more access points 116, the one or more radio nodes 118 and/or the one or more computer network devices 128, in other embodiments one or more of the operations in the communication techniques may be performed remotely, e.g., by a computer or a computer system located at or near a customer premises, such as in or associated with environment 106.

Figure 2:
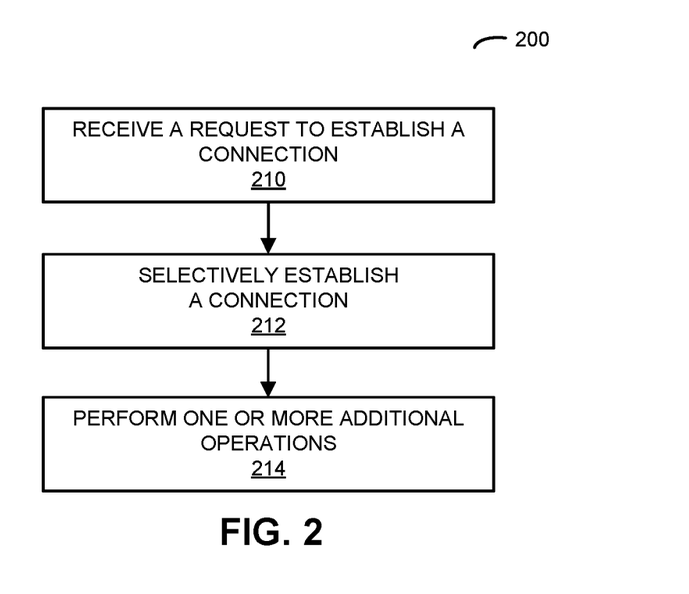
FIG. 2 is a flow diagram illustrating an example of a method for selectively establishing a connection in a network using a computer network device in FIG. 1 in accordance with an embodiment of the present disclosure.

We now describe embodiments of the method. FIG. 2 presents a flow diagram illustrating an example of a method 200 for selectively establishing a connection in a network, which may be performed by a computer network device (such as a given one of the one or more access points 116, the one or more radio nodes 118 and/or the one or more computer network devices 128 in FIG. 1). During operation, the computer network device may receive, associated with a second computer network device, a request to establish a connection, where the request includes an instance of a first type of certificate (operation 210) associated with a first certificate authority for a first layer in a hierarchy in the network and/or an instance of a second type of certificate (operation 210) associated with a second certificate authority for a second layer in the hierarchy, where the first layer is lower in the hierarchy than the second layer. Then, the computer network device may selectively establish the connection (operation 212) in the network with the second computer network device in the first layer and the second layer based at least in part on the instance of the first type of certificate and/or the instance of the second type of certificate.

Note that the computer network device may implement a data plane.

Moreover, the first layer may be associated with a tenant and the second layer may be associated with an MSP of the network, where the tenant is a customer of the MSP.

Furthermore, when the second computer network device is in the first layer, the second computer network device may be an access point. Alternatively, when the second computer network device is in the second layer, the second computer network device may implement a data plane.

Additionally, the second computer network device may be associated with a different manufacturer or provider than a manufacturer or a provider of the computer network device.

In some embodiments, the instance of the first type of certificate may be signed by the first certificate authority, and the instance of the second type of certificate may be signed by the second certificate authority.

In some embodiments, the computer network device may optionally perform one or more additional operations (operation 214). Notably, based at least in part on the instance of the first type of certificate and/or the instance of the second type of certificate, the computer network device may exclude the connection with the second computer network device when the second computer network device is associated with a different tenant of the MSP and/or a different MSP.

Moreover, the instance of the first type of certificate may be associated with a first computer system and the instance of the second type of certificate may be associated with a second computer system, which may be the same as or different from the first computer system. Furthermore, the first computer system and/or the second computer system may include a controller of the computer network device and the one or more other computer network devices.

In some embodiments of method 200, there may be additional or fewer operations. Furthermore, the order of the operations may be changed, and/or two or more operations may be combined into a single operation.

Figure 3:
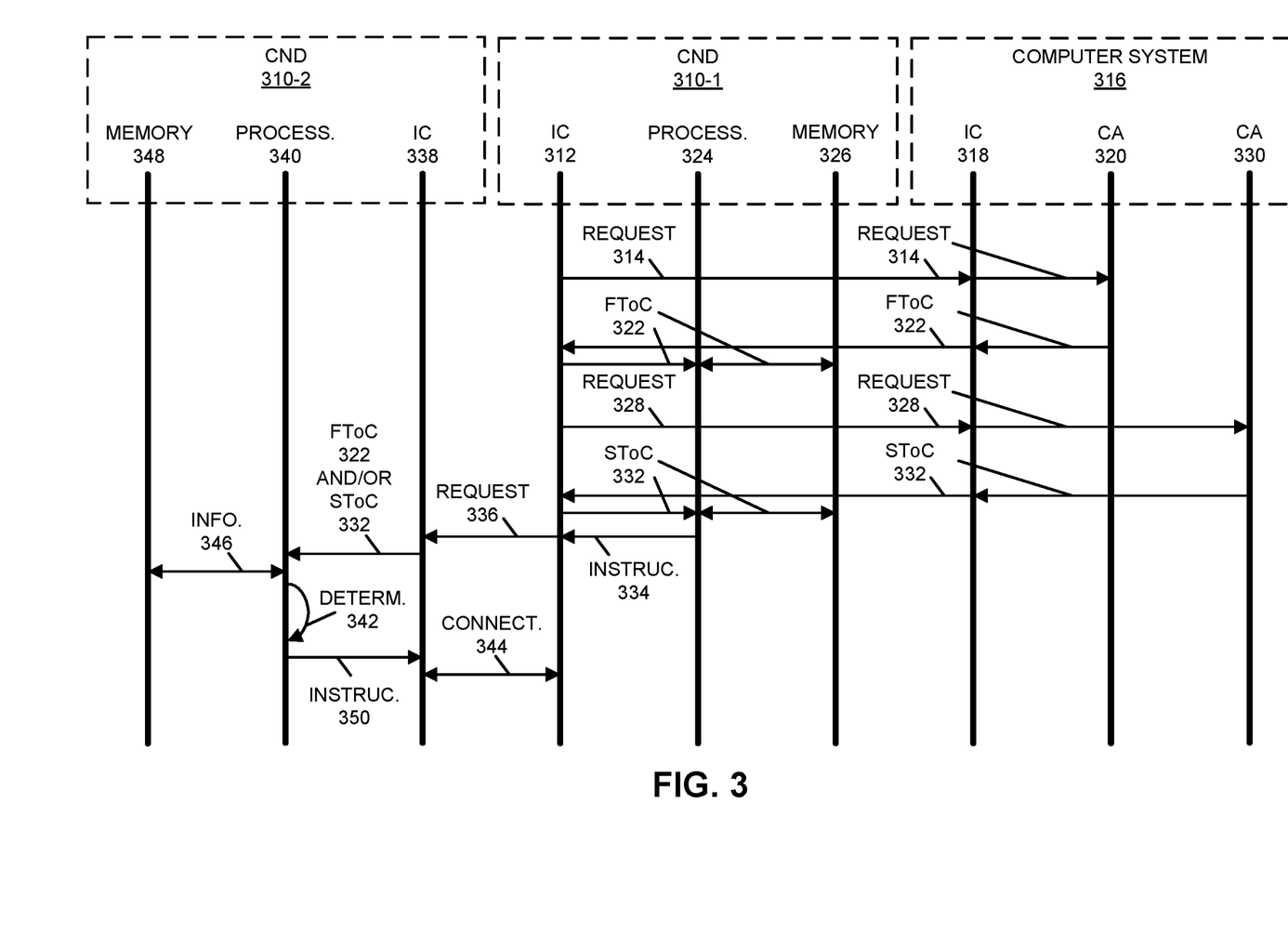
FIG. 3 is a drawing illustrating an example of communication between computer network devices in the network in FIG. 1 in accordance with an embodiment of the present disclosure.

Embodiments of the communication techniques are further illustrated in FIG. 3, which presents a drawing illustrating an example of communication between computer network devices 310 in a network. In FIG. 3, an interface circuit 312 in computer network device 310-1 may provide request 314 for an instance of a first type of certificate (FToC) 322 to computer system 316. After receiving request 314, an interface circuit 318 in computer system 316 may provide request 314 to a certificate authority 320 in computer system 316. In response to request 314, certificate authority 320 may provide the instance of the first type of certificate 322 to interface circuit 318, which provides the instance of the first type of certificate 322 computer network device 310-1. After receiving the instance of the first type of certificate 322, interface circuit 312 provides the instance of the first type of certificate 322 to processor 324 in computer network device 310-1, which stores the instance of the first type of certificate 322 in memory 326 in computer network device 310-1.

Moreover, interface circuit 312 may provide request 328 for an instance of a second type of certificate (SToC) 332 to computer system 316. After receiving request 328, interface circuit 318 may provide request 328 to a certificate authority 330 in computer system 316. In response to request 328, certificate authority 330 may provide the instance of the second type of certificate 332 to interface circuit 318, which provides the instance of the second type of certificate 332 computer network device 310-1. After receiving the instance of the second type of certificate 332, interface circuit 312 provides the instance of the second type of certificate 332 to processor 324, which stores the instance of the second type of certificate 332 in memory 326.

Next, processor 324 may instruct 334 interface circuit 312 to provide, to computer network device 310-2, a request 336 to establish a connection 344, where request 336 may include the instance of the first type of certificate 322 and/or the instance of the second type of certificate 332. Then, interface circuit 312 may provide request 336 to computer network device 110-2 (such as a computer network device that implements a data plane).

After receiving request 336, an interface circuit 338 in computer network device 110-2 may provide to processor 340 in computer network device 110-2 the instance o the first type of certificate 322 and/or the instance of the second type of certificate 332. Next, processor 340 may determine 342 whether connection 344 between computer network device 310-1 and computer network device 310-2 is allowed. For example, the determination may be based at least in part on: the instance of the first type of certificate 322 and/or the instance of the second type of certificate 332. In some embodiments, the determination is optionally based at least in part on information 346 stored in memory 348 in computer network device 310-2.

When the determination 342 is that connection 344 is allowed, processor 340 may instruct 350 interface circuit 338 to establish connection 344 between computer network device 310-1 and computer network device 310-2. However, when the determination 342 is that a connection between computer network device 310-1 and computer network device 310-2 is not allowed, processor 340 may not instruct interface circuit 338 to establish a connection between computer network device 310-1 and computer network device 310-2.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. Notably, a data plane (DP) may have hundreds of access points to which it is allowed to connect. However, managing access control can me complicated and cumbersome. The disclosed communication techniques provide a simpler way to manage access control for different tenants or MSPs. These communication techniques may inform the data plane when an access point (AP) is allowed to connect to it (instead of maintaining a file or a list of allowed access points on the data plane). In particular, the communication techniques may leverage signed certificates that are provided to the access points and the data planes in a network. These certificates may be signed by the associated tenants or MSPs of the access points and the data planes.

Figure 4:
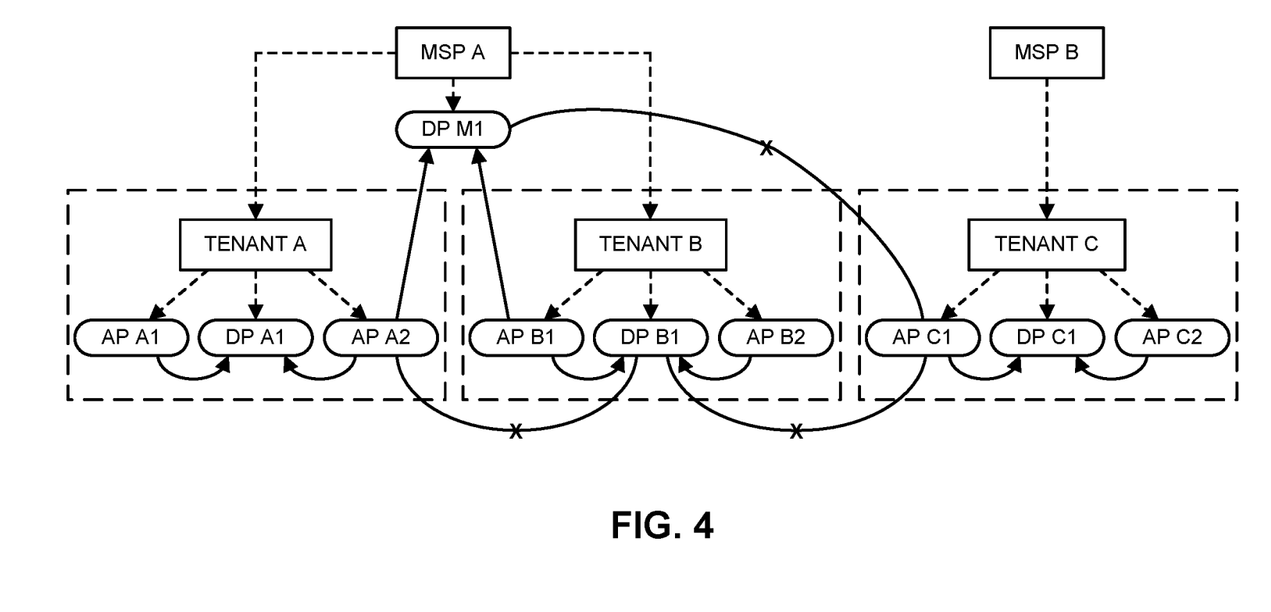
FIG. 4 is a drawing illustrating an example of a network architecture in accordance with an embodiment of the present disclosure.

FIG. 4 presents a drawing illustrating an example of a network architecture. In this network architecture, there are two MSPs (MSP A and MSP B). MSP A has two tenants (tenant A and tenant B), while MSP B has one tenant (tenant C).

Moreover, MSP A, MSP B, tenant A, tenant B, and tenant C may each have one data plane. A given access point may only be allowed to connect to the data plane in the same tenant. Thus, access point A1 and access point A2 may be allowed to connect to data plane A1 in tenant A. Furthermore, access point B1 and access point B2 may be allowed to connect to data plane B1 in tenant B. Additionally, access point C1 and access point C2 may be allowed to connect to data plane C1 in tenant C. However, access point A2 and access point C2 may not be allowed to connect to data plane B1 in a different tenant.

Similarly, a given access point may only be allowed to connect to the data plane in the same MSP. Thus, access point A1, access point A2, access point B1 and access point B2 may be allowed to connect to data plane M1 in MSP A. However, access point C1 and access point C2 may not be allowed to connect to data plane M1 in a different MSP.

Figure 5:
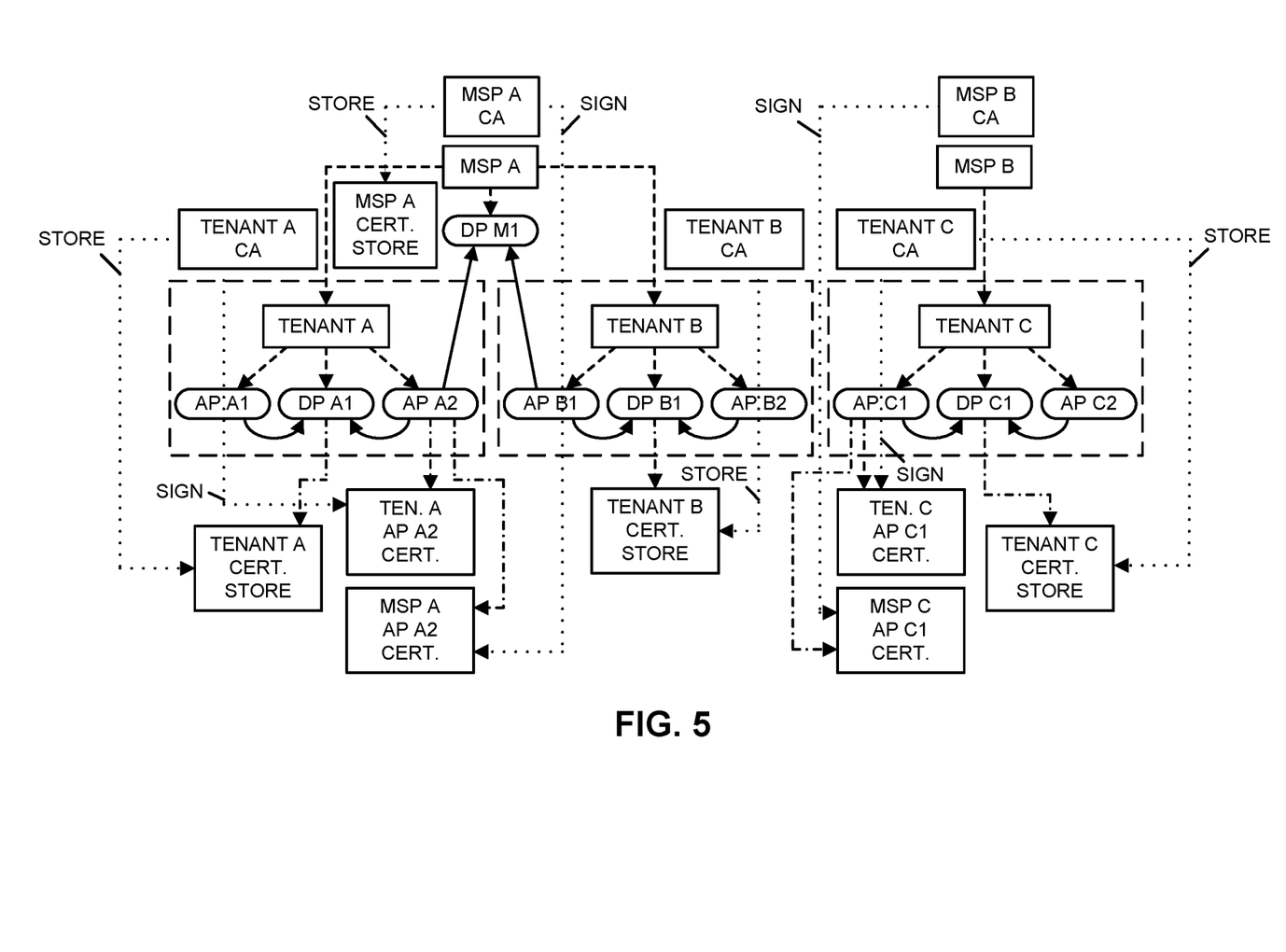
FIG. 5 is a drawing illustrating an example of communication between components in the network in FIG. 1 in accordance with an embodiment of the present disclosure.

The communication techniques are shown in FIG. 5, which presents a drawing illustrating an example of communication between components in the network in FIG. 1. Notably, the MSP and the tenant may act as certificate authorities to sign certificates for access points and/or data planes. In general, depending on the ownership of a given computer network device (such as a given access point or a given data plane), the given computer network device may receive a certificate associated with the associated tenant and/or a certificate associated with the associated MSP.

In FIG. 5, the data planes (such as data plane M1) under an MSP may have the root certificate of their MSP certificate authority (such as MSP A or MSP B) to verify a connection with a given access point. Moreover, the data planes (such as data plane A1 data plane B1, or data plane C1) under a tenant may have the root certificate of their tenant certificate authority (such as tenant A, tenant B or tenant C) to verify the connection with a given access point.

Note that the access points (such as access point A1, access point A2, access point B1, access point B2, access point C1 or access point C2) may have two certificates signed by their tenant certificate authority (tenant A, tenant B or tenant C) and by their MSP certificate authority (MSP A or MSP B), respectively.

Furthermore, after the access points receive different certificates signed by different management entities (such as a tenant and/or an MSP), there may be different authentication scopes based at least in part on the scope of the certificate associated with the root certificate authority.

Figure 6:
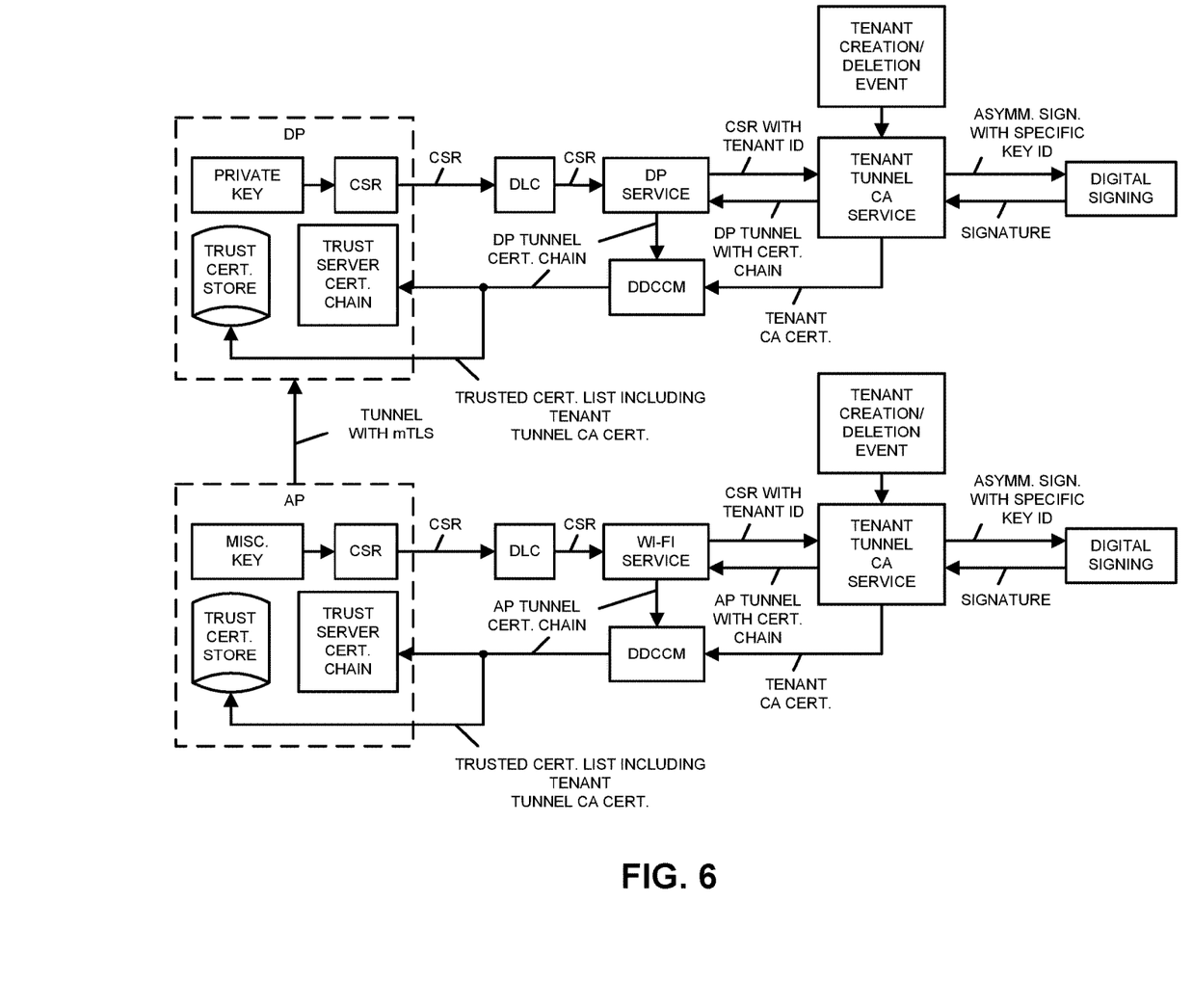
FIG. 6 is a drawing illustrating an example of distributing signed certificates to computer network devices in the network in FIG. 1 in accordance with an embodiment of the present disclosure.

The process of signing and obtaining a certificate is shown in FIG. 6, which presents a drawing illustrating an example of distributing signed certificates to computer network devices in the network in FIG. 1. Notably, in FIG. 6, a given computer network device (such as a given access point or a given data plane) may send a certificate request (CSR) to a device lifecycle (DLC) service). The DLC service may forwards the CSR to a device service (such as a Wi-Fi or a data-plane service). Then, the device service may determine the scope of the one or more certificates that are to be signed (such as by an MSP or a tenant), and may send this scope information to a tenant tunnel certificate authority service. For example, the device service may know the network architecture (such as a hierarchy that includes one or more MSPs on a first or upper level of the hierarchy and one or more tenants on a second or lower level of the hierarchy), which may been previously provided by a tenant and/or an MSP to a controller, and the controller may have provided this information to the device service. Moreover, the tenant tunnel certificate authority service may sign the one or more certificates (e.g., using Google cloud key management service or KMS, from Alphabet, Inc. of Mountain View, California) and may send the one or more signed certificates back to the device service. Next, the device service may send the one or more signed certificates to a data-driven common-configuration module (DDCCM) service, which may push the one or more signed certificates to the given computer network device. Note that multiple components with the same name in FIG. 6 may be implemented using a single instance of the component.

We now describe embodiments of an electronic device, which may perform at least some of the operations in the communication techniques. FIG. 15 presents a block diagram illustrating an example of an electronic device 1500 in accordance with some embodiments, such as one of: base station 108, one of electronic devices 110, computer system 112, one of access points 116, one of radio nodes 118, one of computer network device 128 or computer system 130. This electronic device includes processing subsystem 1510, memory subsystem 1512, and networking subsystem 1514. Processing subsystem 1510 includes one or more devices configured to perform computational operations. For example, processing subsystem 1510 can include one or more microprocessors, graphics processing units (GPUs), ASICs, microcontrollers, programmable-logic devices, and/or one or more digital signal processors (DSPs).

Memory subsystem 1512 includes one or more devices for storing data and/or instructions for processing subsystem 1510 and networking subsystem 1514. For example, memory subsystem 1512 can include DRAM, static random access memory (SRAM), and/or other types of memory. In some embodiments, instructions for processing subsystem 1510 in memory subsystem 1512 include: one or more program modules or sets of instructions (such as program instructions 1522 or operating system 1524, such as Linux, UNIX, Windows Server, or another customized and proprietary operating system), which may be executed by processing subsystem 1510. Note that the one or more computer programs, program modules or instructions may constitute a computer-program mechanism. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), including: control logic 1516, an interface circuit 1518 and one or more antennas 1520 (or antenna elements). (While FIG. 15 includes one or more antennas 1520, in some embodiments electronic device 1500 includes one or more nodes, such as antenna nodes 1508, e.g., a metal pad or a connector, which can be coupled to the one or more antennas 1520, or nodes 1506, which can be coupled to a wired or optical connection or link. Thus, electronic device 1500 may or may not include the one or more antennas 1520. Note that the one or more nodes 1506 and/or antenna nodes 1508 may constitute input(s) to and/or output(s) from electronic device 1500.) For example, networking subsystem 1514 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 1500 may be adapted or changed using pattern shapers (such as directors or reflectors) and/or one or more antennas 1520 (or antenna elements), which can be independently and selectively electrically coupled to ground to steer the transmit antenna pattern in different directions. Thus, if one or more antennas 1520 include N antenna pattern shapers, the one or more antennas may have 2N different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices as described previously.

Within electronic device 1500, processing subsystem 1510, memory subsystem 1512, and networking subsystem 1514 are coupled together using bus 1528. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a display subsystem 1526 for displaying information on a display, which may include a display driver and the display, such as a liquid-crystal display, a multi-touch touchscreen, etc.

Moreover, electronic device 1500 may include a user-interface subsystem 1530, such as: a mouse, a keyboard, a trackpad, a stylus, a voice-recognition interface, and/or another human-machine interface. In some embodiments, user-interface subsystem 1530 may include or may interact with a touch-sensitive display in display subsystem 1526.

Electronic device 1500 can be (or can be included in) any electronic device with at least one network interface. For example, electronic device 1500 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments instructions 1522 is included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514 and/or of electronic device 1500. The integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1522, operating system 1524 (such as a driver for interface circuit 1518) or in firmware in interface circuit 1518. Alternatively or additionally, at least some of the operations in the communication techniques may be implemented in a physical layer, such as hardware in interface circuit 1518.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
an interface circuit configured to communicate with a second computer network device in a network;
a processor coupled to the interface circuit; and
memory, coupled to the processor, storing program instructions, wherein, when executed by the processor, the program instructions cause the computer network device to perform operations comprising:
receiving, associated with the second computer network device, a request to establish a connection, wherein the request comprises an instance of a first type of certificate associated with a first certificate authority for a first layer in a hierarchy in the network, an instance of a second type of certificate associated with a second certificate authority for a second layer in the hierarchy, or both, wherein the first layer is lower in the hierarchy than the second layer, wherein the first layer is associated with a tenant and the second layer is associated with a managed service provider (MSP) of the network, and wherein the tenant is a customer of the MSP;
selectively establishing a connection in the network with the second computer network device based at least in part on the instance of the first type of certificate, the instance of the second type of certificate, or both; and
based at least in part on the instance of the first type of certificate, the instance of the second type of certificate, or both, excluding the connection with the second computer network device when the second computer network device is associated with a different tenant of the MSP, a different MSP or both.

2. The computer network device of claim 1, wherein the computer network device is configured to implement a data plane.

3. The computer network device of claim 1, wherein the second computer network device comprises: an access point, or implements a data plane.

4. The computer network device of claim 1, wherein, when the second computer network device is in the first layer, the second computer network device comprises an access point.

5. The computer network device of claim 1, wherein, when the second computer network device is in the second layer, the second computer network device implements a data plane.

6. The computer network device of claim 1, wherein the second computer network device is associated with a different manufacturer or provider than a manufacturer or a provider of the computer network device.

7. The computer network device of claim 1, wherein the instance of the first type of certificate is associated with a first computer system and the instance of the second type of certificate is associated with a second computer system; and
wherein the second computer system is different from the first computer system.

8. The computer network device of claim 7, wherein the first computer system, the second computer system or both comprise a controller of the computer network device and the second computer network device.

9. The computer network device of claim 1, wherein the instance of the first type of certificate is signed by the first certificate authority, and the instance of the second type of certificate is signed by the second certificate authority.

10. A non-transitory computer-readable storage medium for use in conjunction with a computer network device, the computer-readable storage medium storing program instructions that, when executed by the computer network device, cause the computer network device to perform operations comprising:
receiving, associated with a second computer network device, a request to establish a connection, wherein the request comprises an instance of a first type of certificate associated with a first certificate authority for a first layer in a hierarchy in a network, an instance of a second type of certificate associated with a second certificate authority for a second layer in the hierarchy, or both, wherein the first layer is lower in the hierarchy than the second layer, wherein the first layer is associated with a tenant and the second layer is associated with a managed service provider (MSP) of the network, and wherein the tenant is a customer of the MSP;
selectively establishing a connection in the network with the second computer network device based at least in part the instance of the first type of certificate, the instance of the second type of certificate, or both; and
based at least in part on the instance of the first type of certificate, the instance of the second type of certificate, or both, excluding the connection with the second computer network device when the second computer network device is associated with a different tenant of the MSP, a different MSP or both.

11. The non-transitory computer-readable storage medium of claim 10, wherein the computer network device implements a data plane.

12. The non-transitory computer-readable storage medium of claim 10, wherein the instance of the first type of certificate is associated with a first computer system and the instance of the second type of certificate is associated with a second computer system; and
wherein the second computer system is different from the first computer system.

13. The non-transitory computer-readable storage medium of claim 10, wherein, when the second computer network device is in the first layer, the second computer network device comprises an access point.

14. A method for selectively establishing a connection in a network, comprising:
by a computer network device:
receiving, associated with a second computer network device, a request to establish a connection, wherein the request comprises an instance of a first type of certificate associated with a first certificate authority for a first layer in a hierarchy in the network, an instance of a second type of certificate associated with a second certificate authority for a second layer in the hierarchy, or both, wherein the first layer is lower in the hierarchy than the second layer, wherein the first layer is associated with a tenant and the second layer is associated with a managed service provider (MSP) of the network, and wherein the tenant is a customer of the MSP;
selectively establishing the connection in the network with the second computer network device based at least in part the instance of the first type of certificate, the instance of the second type of certificate, or both; and
based at least in part on the instance of the first type of certificate, the instance of the second type of certificate, or both, excluding the connection with the second computer network device when the second computer network device is associated with a different tenant of the MSP, a different MSP or both.

15. The method of claim 14, wherein the computer network device implements a data plane.

16. The method of claim 14, wherein the instance of the first type of certificate is associated with a first computer system and the instance of the second type of certificate is associated with a second computer system; and
wherein the second computer system is different from the first computer system.

17. The method of claim 14, wherein, when the second computer network device is in the first layer, the second computer network device comprises an access point.

18. The method of claim 14, wherein the instance of the first type of certificate is signed by the first certificate authority, and the instance of the second type of certificate is signed by the second certificate authority.

19. The method of claim 14, wherein the second computer network device is associated with a different manufacturer or provider than a manufacturer or a provider of the computer network device.

20. The method of claim 14, wherein the instance of the first type of certificate is associated with a first computer system and the instance of the second type of certificate is associated with a second computer system; and
wherein the second computer system is different from the first computer system.

* * * * *